United States Patent [19]

Thierry et al.

[11] Patent Number: 5,085,801
[45] Date of Patent: Feb. 4, 1992

[54] TEMPERATURE INDICATORS BASED ON POLYDIACETYLENE COMPOUNDS

[75] Inventors: Annette Thierry; Jacques Le Moigne, both of Strasbourg, France

[73] Assignee: Centre National De La Recherche Scientifique, Paris, France

[21] Appl. No.: 717,869

[22] Filed: Jun. 19, 1991

Related U.S. Application Data

[63] Continuation of Ser. No. 512,610, Apr. 23, 1990, abandoned, which is a continuation of Ser. No. 141,608, filed as PCT/FR87/00145, Apr. 30, 1987, abandoned.

[30] Foreign Application Priority Data

Apr. 30, 1986 [FR] France .................................. 8606320

[51] Int. Cl.$^5$ .......................................... G01N 31/22
[52] U.S. Cl. .................................. 252/408.1; 436/165; 422/57
[58] Field of Search ............... 252/408.1; 436/165; 422/57

[56] References Cited

U.S. PATENT DOCUMENTS

| | | | |
|---|---|---|---|
| 3,999,946 | 12/1976 | Patel et al. | 422/56 |
| 4,195,056 | 3/1980 | Patel et al. | 422/56 |
| 4,195,057 | 3/1980 | Patel et al. | 422/56 |
| 4,195,058 | 3/1980 | Patel et al. | 422/56 |
| 4,215,208 | 7/1980 | Yee et al. | 252/408.1 |
| 4,339,240 | 7/1982 | Patel et al. | 422/56 |
| 4,339,951 | 7/1982 | Yee et al. | |
| 4,439,346 | 3/1984 | Patel et al. | 422/56 |
| 4,624,761 | 11/1986 | Lando . | |
| 4,788,151 | 11/1988 | Preziosi et al. | 436/2 |

FOREIGN PATENT DOCUMENTS

| | | |
|---|---|---|
| 1043945 | 5/1978 | Canada . |
| 0036899 | 8/1984 | European Pat. Off. . |
| 1525738 | 5/1968 | France . |
| 2341848 | 9/1977 | France . |

OTHER PUBLICATIONS

Armitage et al., J. Chem. Soc., 1951, 44–47.
Armitage et al., J. Chem. Soc., 1952, 1993–2010.
Melveger and Baughman, J. Poly Sci. Poly. Phys. Ed., 11, 603–619 (1973).
Wegner, Pure & App. Chem., 49, 443–454 (1977).
Kiji et al., Chem. Letters, Jap., 35–36 (1985).

Primary Examiner—Robert L. Stoll
Assistant Examiner—Valerie Fee
Attorney, Agent, or Firm—Brooks Haidt Haffner & Delahunty

[57] ABSTRACT

At least one polydiacetylene compound is suitable for detecting whether an article has ever exceeded a selected temperature. The polydiacetylene compound is deposited on a substrate or mixed with a thermoplastic material. The polydiacetylene compound instantaneously and irreversibly changes from blue to red at the threshold temperature.

14 Claims, 7 Drawing Sheets

TEMPERATURE INDICATORS BASED ON POLYDIACETYLENE COMPOUNDS

This application is a continuation of application Ser. No. 07/512,610, filed Apr. 23, 1990 now abandoned, which is a continuation of Ser. No. 141,608 filed as PCT/FR87/00145, now abandoned.

The present invention relates to temperature indicators based on polydiacetylene compounds.

It may be necessary to know the temperature history of a perishable product, particularly if a temperature threshold has been exceeded, the said threshold temperature possibly detracting from the qualities of the product in question. The latter can be, for example, a foodstuff, a pharmaceutical product, a biomedical product or a photographic product. In particular, in view of the current regulations applying to frozen or quick-frozen products, it is necessary to have a reliable means of knowing whether a quick-frozen product has been thawed and subsequently re-frozen.

The present invention provides a means of detecting whether a threshold temperature for a perishable product has been exceeded by using the principle of the irreversible color change of a thin film of a diacetylenic polymer during a rise in temperature.

Acetylene compounds have been studied at great length since the 1950's, in particular for their photosensitive properties.

Certain diacetylenes have the characteristic of polymerizing in the solid state, generally due to a thermal effect or through exposure to high-energy radiation (UV, X-rays or gamma rays, slow electrons).

Polymerization occurs in the 1,4-positions according to the following scheme:

The monomer is generally colorless but absorbs strongly in the UV range. An intense color appears during polymerization. In general, it has been accepted that this coloration is due to the strong delocalization of the pi electrons along the polymer chain through overlapping of the pi orbitals of the carbons.

It has been possible to establish a relationship between the color of the polymer and the conjugation length: it has been generally acknowledged that a blue color appears if the polydiacetylenic chains are planar and rigid, the conjugation lengths then being greater than about thirty monomer units. If the chains are partially planar or periodically interrupted, i.e. if the conjugation length decreases, the polymer becomes red.

It will be noted that the symmetrical $C_6$, $C_8$ and $C_{12}$ alkyldiacetylenes, i.e. hexa-2,4-diyne, octa-3,5-diyne and dodeca-5,7-diyne respectively, were prepared by Armitage et al. J. Chem. Soc., 44 (1951) and 1998 (1952)] for the purpose of studying their spectroscopic properties. BAUGHMAN et al. [J. Pol. Sci. Pol. Phys. Ed. 11, 609 (1973)] subsequently stated that this series of polymers polymerized only with great difficulty.

The principal unsymmetrical diacetylenic hydrocarbons which have been studied are the derivatives of the formula:

in which $R=C_nH_{2n+1}$, where n is equal to 2 or 4.

To the knowledge of the Applicant Company, only one unsymmetrical hydrocarbon with long paraffinic sidechains is mentioned in the literature (French Patent 1 525 738), namely hexacosa-11,13-diyne.

Diacetylenic diacids in the crystalline state quickly become colored, generally red, in the light. If the chains are fairly long, for example 22 carbon atoms, the same diacids adopt a blue coloration on irradiation and then turn red on heating. The existence of the color change of diacetylenic derivatives in general has therefore been known for a very long time.

French Patent 1 525 738 describes a long series of photosensitive diacetylenes which can be used for recording images. These diacetylenes are, inter alia, diacids mainly containing 10, 20 and 24 carbon atoms, the corresponding esters and also alkyldiacetylenes with 24 and 28 carbon atoms. The said patent states the colors of the various compounds and their sensitivities to irradiation. A color change from blue to red at about 20°–25° C. is mentioned in the case of tetracosa-11,13-diyne. It is indicated that the perturbation of the crystal structure, either on heating or on contact with a solvent for the irradiated polymer, causes the transformation or conversion of the initial photosensitive product into another, reddish-colored product. This reddish product is thermochroic and exhibits an irreversible color change.

French Patent 2 341 848 relates to a time-temperature history indicator using diacetylenic or polyacetylenic derivatives. The principle is based on the color change of the sample during polymerization of the diacetylene. The polymerization rate depends on the temperature of the sample. A time-temperature integrator is thus obtained. The monomers used are diacetylenes from the following series: urethanes, sulfonates, unsymmetrical acid-alcohol molecules or alternatively cyclic derivatives such as those corresponding to the formula:

Wegner [Pure Appl. Chem., 49. 443 (1977)] studied more particularly the reactivities of diacetylenes. The reactivity of substituted diacetylenes with paraffinic chains depends on the evenness of the number of carbons forming this chain. The highest reactivity is obtained for side-chains with an even number of carbons. Wegner also studied the reactivity of these same molecules as a function of the wavelength and he obtained the maximum sensitivity for UV wavelengths around 250 nm, corresponding to the absorption of both the conjugated triple bond and the alkyl chain.

European Patent 0 036 899 relates to the use of reversibly thermochromic, polymerizable diacetylene compositions for measuring temperature. The proposed diacetylenes are derivatives of the series, in which n=2, 3 or 4 and R and R' are especially $C_1$-$C_4$ alkyl groups.

These systems exhibit a hysteresis of the thermochromism which can vary from a few degrees to 80° C. It has been possible to relate this hysteresis o the doses of gamma radiation used for polymerization; weak doses produce the greatest hysteresis effects, while strong doses of radiation produce high degrees of conversion to polymer and create small hysteresis effects of the order of 20° to 30° C.

In a recent article, J. KIJI et al. [Chem. Lett. Jp. 35, 1985] re-studied the series of symmetrical alkyldiacetylenes containing 16, 20, 24 and 28 carbon atoms. Polymerization was effected by UV irradiation at −78° C. and finally resulted in red polymers. There was no indication of thermochromism for these polymers.

The prior art cited above shows that polydiacetylene compounds have indeed been widely studied for their photosensitive properties. It will be noted, however, that the color changes observed for the different polymers described, which depend on a variety of parameters, are not always irreversible.

A family of diacetylenic monomers has now been found which, on polymerization, produce polymers undergoing an irreversible color change from blue to red at a given temperature.

The monomers, which are suitable for obtaining the temperature indicators according to the invention, are diacetylenes of the general formula R—C≡C—C≡C—R, in which the substituents R are saturated aliphatic chains. They can be represented by formula 1 below:

in which n and n', which are identical or different, represent an integer between 2 and 21. The unsymmetrical compounds (n and n' different) are particularly preferred for the purposes of the invention.

For the sake of convenience, the above diacetylenes will be referred to in the remainder of the present description by the total number of carbons in the monomer unit, i.e , for example, $C_{16}$, $C_{20}$, $C_{22}$, $C_{24}$, $C_{28}$ and $C_{32}$. Furthermore, for the unsymmetrical diacetylenic monomers, the number of carbon atoms in the starting monoacetylene compounds will be added as a subscript; for example:

$C_{18(8-10)}$ will denote octadeca-7,9-diyne and
$C_{22(8-14)}$ will denote docosa-7,9-diyne.

All these diacetylenic monomers are colorless.

The above monomers or mixtures thereof are polymerizable only in the crystalline state in the form of a crystalline film or single crystal. The crystalline state is obtained either by cooling from the liquid state or by crystallization from a solution.

Polymerization can be performed in different ways which are well known to those skilled in the art. In particular, a possible method is photopolymerization by exposure to high-energy radiation such as, for example, UV radiation, X-rays or gamma rays, or slow electron radiation. The polymerization depends on the temperature and the crystal structure and varies according to the substrate on which the monomer is deposited.

The polymers obtained or the polymer/monomer mixtures are blue in color. They have absorption bands of varying width for the long wavelengths of the visible spectrum (580-650 nm). It will be noted that these bands tend to shift slightly towards the shorter wavelengths as the polymerization time increases.

The blue color is already apparent at low degrees of polymerization (of the order of one per cent). In the remainder of the present description, the term "polydiacetylene compound" will denote all the blue-colored products, whether they be pure polymers or polymer/monomer mixtures, even when the proportion of polymers is low.

During an increase in temperature of the polydiacetylene compound obtained, the fusion of the side-groups on the polydiacetylenic chain gives this chain a degree of mobility. This results in a loss of planarity of the chain, i.e. a reduction in the conjugation length, which manifests itself by a profound modification of the absorption spectrum, the absorption band at 600-650 nm tending to disappear.

This thermodynamic transition, which induces a color change in the polydiacetylene compound, has been shown to correspond to the fusion of the alkyl chains on the polymer. Furthermore, this color change or transition, which is actually equivalent to a decrease in the order of the polymer system, is irreversible.

A new family of polydiacetylene compounds has therefore been selected which exhibit a particular thermochromic behavior, namely an irreversible color change from blue to red which takes place at a given temperature specific for the length of the alkyl chain on the starting monomer. These polydiacetylene compounds can be used as temperature indicators.

The present invention therefore relates to temperature indicators which consist of at least one polydiacetylene compound obtained by the polymerization of a diacetylenic monomer of formula (1) as defined above, or a mixture thereof, the said monomer or monomers being in the crystalline state.

The invention is further described by reference to the accompanying drawings, wherein.

The temperature indicators of the invention are advantageously deposited on a chemically inert, solid substrate in the form of a thin film. The substrate, which must be inert not only towards the polydiacetylene compound but also towards the perishable product, can be, for example, paper, glass, fabric, quartz, a metal such as aluminum, or a polymer such as polyethylene.

The temperature indicators of the invention can also advantageously be incorporated as additives or as a mixture in a thermoplastic which is chemically inert towards the polydiacetylene compound.

The thermoplastic can be a polymer compatible with olefins such as polyolefins, for example polyethylene. Mixing is effected in the polymer in the molten state, after which the thin film obtained on cooling is subjected to photopolymerization in order to form the polydiacetylene compound.

The temperature indicator can consist either of a single polydiacetylene compound or of a carefully chosen mixture of such compounds, according to the temperature which it is desired to detect.

The symmetrical diacetylenic monomers of formula (1) above can be obtained by oxidative coupling of the alkyne by copper salts in accordance with the process described by EGLINGTON et al. in J. Chem. Soc., 889 (1959). This process consists in heating an alkyne in the presence of a copper salt, for example copper acetate, in a pyridine/methanol/ether mixture, at a temperature of between bout 30° and 35° C., under a gentle stream of pure oxygen, for about 48 to 72 h. The ether and methanol are then removed, for example by evaporation under reduced pressure, after removal of the excess oxygen. The solution is taken up by fresh anhydrous pyridine, for 48 to 72 h, at between 40° and 50° C. under reflux. The pyridine is then removed and the residual mixture is acidified. After extraction with ether, an oily product is obtained which crystallizes in the cold. This oily product is then purified by chromatography in accordance with known methods.

As examples of starting alkynes, it is possible to use commercially available products without further purification, such as, for example, the products known under the tradenames EGA 24,442-2 (hex-1-yne), EGA 24,446-5 (oct-1-yne), EGA 24,438-4 (dec-1-yne) and EGA 24,440-6 (dodec-1-yne), marketed by EGA-ALDRICH. These products can also be synthesized. For example, the $C_{16}$ alkyne can be synthesized via sodium acetylide in liquid ammonia, which is subsequently substituted by tetradecyl bromide in dimethylformamide in accordance with the process described by W. Ziegenbein et al., Chemistry of Acetylene, H. C. Viehe, p. 187, published by Marcel Dekker NY (1969).

It is also possible to use the process involving dehydrobromination of the corresponding 1,2-dibromide, this process being well known to those skilled in the art.

The unsymmetrical diacetylenic monomers of formula (1) above can also be obtained by oxidative coupling in accordance with the process described above, using a mixture of two monoacetylenic hydrocarbons of different chain lengths in appropriate proportions.

The polymerization of the diacetylenic monomers of formula (I) is advantageously performed by the irradiation, with high-energy radiation, for example UV radiation (254 nm UV lamp), of a thin crystalline film of a monomer or monomer mixture.

The absorption characteristics of the polydiacetylene compound formed vary according to the polymerization time. For relatively short times (about 30 s), the polydiacetylene compound obtained shows a principal absorption peak at about 650 nm. When the irradiation time is increased, the spectrum moves towards the short wavelengths, the dominant shade of the product remaining blue.

Although all the polydiacetylene compounds obtained after different irradiation times are suitable for the purposes of the invention, it is preferable to use polydiacetylene compounds which have a relatively low degree of polymerization, i.e. the compounds having an absorption peak at about 580–650 nm.

The polydiacetylene compound obtained by irradiating a single diacetylenic monomer exhibits a sudden color change in a narrow temperature range, without modification of the degree of polymerization. As indicated previously, the transition temperature depends on the number of carbons in the paraffinic chain. In the case of the symmetrical alkyldiacetylenes, the transitions are spaced about twenty degrees apart for the series $C_{16}$, $C_{20}$, $C_{24}$, $C_{28}$, $C_{32}$. The polymers obtained by irradiating a mixture of monomers of different alkyl chain lengths retain the color change properties of the homopolymer, but the transition regions are generally between the temperatures of each of the monomers, making it possible to replace the discrete range of transition temperatures by a quasi-continuous range. It will be noted that the mixtures generally have eutectics.

Moreover, it should be noted that the monomer present in the polydiacetylene compound can also be polymerized by further irradiation in the crystalline state. The absorption spectrum obtained will then be superimposed on the irreversible red spectrum.

In this case, the color indicator according to the invention must therefore be protected from polymerization-initiating radiation by any appropriate means.

The invention will now be described in greater detail by the non-limiting illustrative examples below.

In these examples, the purity of the monomers was checked by gas chromatography, mass spectrometry and NMR. The main residual impurity detected is the starting alkyne, its concentration being of the order of 2% or less in each case.

A—Preparation of the monomers and monomer mixtures

EXAMPLE 1

Preparation of tetracosa-11,13-diyne or $C_{24}$ monomer
(formula I: n=n'=9)

Dodec-1-yne (EGA 24,440-6) (1.2 g) was heated in the presence of copper acetate (4 g) in a mixture of pyridine (100 cm$^3$), methanol 300 cm$^3$) and ether (400 cm$^3$), for 72 h, at 30°-32° C., in the presence of a gentle stream of pure oxygen. The ether and methanol were then evaporated off under reduced pressure after the excess dissolved oxygen had been removed by the passage of argon, in the presence of 1 g of CuCl. The solution was taken up by fresh anhydrous pyridine (400 cm$^3$) for 72 h at 47° C. (reflux). Part of the pyridine was then evaporated off under reduced pressure, after which the mixture was acidified with a 10% aqueous solution of HCl. After extraction with ether and evaporation, an oily liquid was obtained which crystallized in the cold. The oil was chromatographed in CHCl$_3$ on SiO$_2$ to give an oil which was transparent at room temperature (0.877 g, y=73%). The product was checked by NMR, gas chromatography (purity 97%) and mass spectroscopy (peak 330).

EXAMPLE 2

Preparation of the symmetrical $C_{12}$, $C_{16}$, $C_{18}$, $C_{20}$, $C_{22}$, $C_{28}$ and $C_{32}$ monomers By repeating the procedure of Example 1, the $C_{12}$, $C_{16}$, $C_{20}$, $C_{22}$, $C_{28}$ and $C_{32}$ diacetylenes were obtained from the following alkynes: hex-1-yne, oct-1-yne, non-1-yne, dec-1-yne, undec-1-yne, tetradec-1-yne and hexadec-1-yne respectively; the melting points (or transition temperatures) of these diacetylenes, measured by differential scanning microcalorimetry (DSC), are indicated in Table I below.

TABLE I

Transition temperatures of the different alkyldiacetylenes, measured by DSC

| diacetylene | n = n' | M.p. °C. | nomenclature |
|---|---|---|---|
| $C_{12(6-6)}$ | 3 | $-62^{(b)}$ | dodeca-5,7-diyne |
| $C_{16(8-8)}$ | 5 | $-29.4^{(a)}$ | hexadeca-7,9-diyne |
| $C_{18(9-9)}$ | 6 | $+8.2^{(b)}$ | octadeca-8,10-diyne |
| $C_{20(10-10)}$ | 7 | $-1.6^{(a)}$ | eicosa-9,11-diyne |
| $C_{22(11-11)}$ | 8 | $+31.1^{(a)}$ | docosa-10,12-diyne |
| $C_{24(12-12)}$ | 9 | $+20.5^{(a)}$ | tetracosa-11,13-diyne |
| $C_{28(14-14)}$ | 11 | $+36.9^{(a)}$ | octacosa-13,15-diyne |
| $C_{32(16-16)}$ | 13 | $+50.1^{(a)}$ | dotriaconta-15,17-diyne |

DSC:
$(a)$ rate 1.25° C. min$^{-1}$
$(b)$ rate 5.0° C. min$^{-1}$

EXAMPLE 3

Preparation of the $C_{16}$–$C_{20}$, $C_{20}$–$C_{24}$ and $C_{16}$–$C_{28}$ monomer mixtures The monomers obtained according to Examples 1 or 2 were mixed in the liquid state. The transition temperatures of these mixtures were measured by differential scanning calorimetry (DSC). The transition temperature diagrams for these mixtures are shown in the attached FIGS. 1a, 1b and 1c, on which the temperature in degrees Celsius has been plotted on the ordinate and the composition of the monomer mixture on the abscissa. The scanning rate of the microcalorimeter was 5° C./min.

Figure 1A:
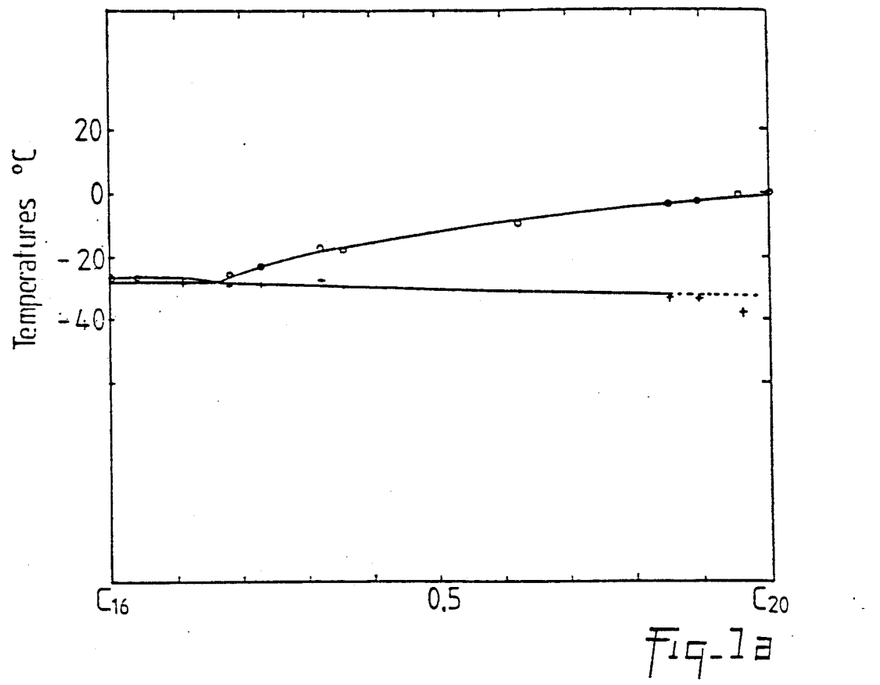
FIGS. 1a, 1b, and 1c are differential scanning calorimeter diagrams of monomers.
Figure 1B:
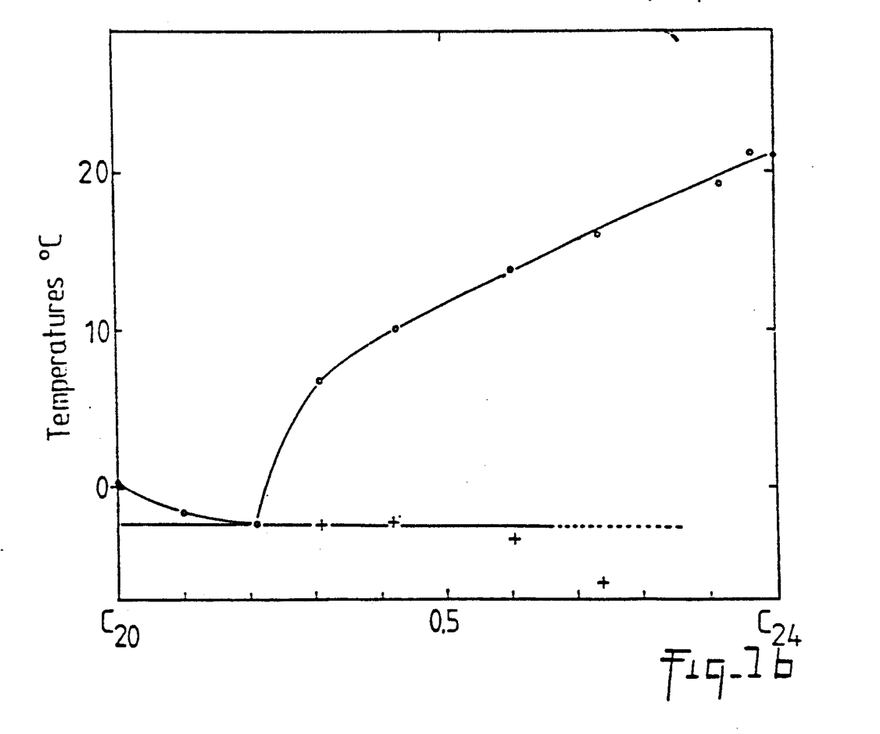
Figure 1C:
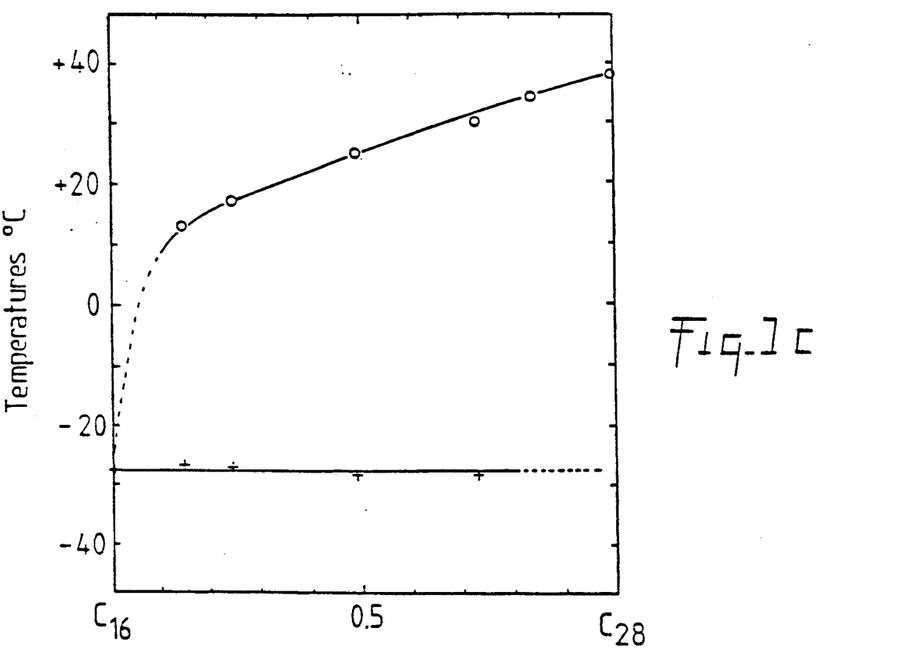

FIGS. 1a, 1b and 1c respectively represent the following mixtures:

| | |
|---|---|
| $C_{16}$–$C_{20}$ | FIG. 1a |
| $C_{20}$–$C_{24}$ | FIG. 1b |
| $C_{16}$–$C_{28}$ | FIG. 1c |

Eutectics were observed for the $C_{16}$–$C_{20}$ and $C_{20}$–$C_{24}$ mixtures, for 18% of $C_{20}$ and 21% of $C_{24}$ respectively. The transition temperatures of these eutectics are of the order of $-30°$ C. and $-2°$ C. respectively.

EXAMPLE 4

4.1 Preparation of octadeca-7,9-diyne

Oct-1-yne and dec-1-yne were subjected to oxidative coupling in accordance with the procedure described above (Example 1). The reaction yielded a mixture of three monomers Careful choice of the proportions of the starting alkynes made it possible to obtain a mixture formed essentially of two constituents.

A mixture of 1.65 g of oct-1-yne and 4.14 g of dec-1-yne gave 4.89 g of a compound consisting of 4% of hexadeca-7,9-diyne, 33% of octadeca-7,9-diyne and 63% of eicosa-9,11-diyne.

The transition temperatures of this mixture are given in Table 11 below (mixture no. 1).

The constituents of the mixture were separated by preparative chromatography, this separation yielding three fractions (stationary phase $SiO_2$—$C_8$, eluent acetonitrile). Gas chromatographic analysis of the useful fraction gave the following composition: $C_{18(8-10)}$95%, $C_{20(10-10)}$2%, $C_{16(8-8)}$1.5%. Mass spectrometric analysis, M=246 ($NH_3$ chemical ionization, peaks observed: M+1, M+18), corresponds to octadeca-7,9-diyne ($C18(8-10)$)

The transition temperature is measured by differential scanning microcalorimetry (DSC). The transition takes place by a single peak situated at $-26.5°$ C.

4.2 Preparation of the diacetylenes nonadeca-4,6-diyne, docosa-9,11-divne, docosa-7,9-diyne and tetracosa-9,11-diyne Mixtures no. 2, 3, 4 and 5, consisting of two or three different diacetylenes, are obtained by repeating the procedure described in Example 4.1 with the following pairs of alkynes: pent-1-yne/tetradec-1-yne, dec-1-yne/dodec-1-yne, oct-1-yne/tetradec-1-yne and dec-1-yne/tetradec-1-yne. The characteristics of these mixtures are collated in Table II.

The unsymmetrical diacetylene fraction was separated from these mixtures by a method identical to that used for $C_{18(8-10)}$. The purity of the monomers, as checked by gas chromatography, is as follows: $C_{19(5-14)}$87%, $C_{22(10-12)}$96%, $C_{22(8-14)}$92%, $C_{24(10-14)}$ 96%. The transition temperature of these unsymmetrical diacetylenes is indicated in Table III below.

The mixtures described above can be used as such for polymerization, without separation.

TABLE II

Preparation of the unsymmetrical diacetylenes: analysis of the mixtures by gas chromatography and characterization of the transition temperatures by DSC:

| No. | Unsymmetrical diacetylene | % diacetylene species (GC-FID)* | Transition temperatures of the mixture, °C. (DSC) |
|---|---|---|---|
| 1 | $C_{18(8-10)}$ | 10% $C_{16(8-8)}$ | $-40$ |
| | | 43% $C_{18(8-10)}$ | $-33$ |
| | | 47% $C_{20(10-10)}$ | $-10$ |
| 2 | $C_{19(5-14)}$ | 46% $C_{19(5-14)}$ | $-28.1$ |
| | | 15% $C_{28(14-14)}$ | $+27.6$ |
| 3 | $C_{22(10-12)}$ | 21% $C_{20(10-10)}$ | $-19.5, -7.2$ |
| | | 49% $C_{22(10-12)}$ | $-3.3$ |
| | | 29% $C_{24(12-12)}$ | $+2.8$ |
| 4 | $C_{22(8-14)}$ | 68% $C_{16(8-8)}$ | $-39.6$ |
| | | 30% $C_{22(8-14)}$ | $-21.4$ |
| 5 | $C_{24(10-14)}$ | 36% $C_{20(10-10)}$ | $-10$ |
| | | 53% $C_{24(10-14)}$ | $+3.5$ |
| | | 8% $C_{28(14-14)}$ | $+8.9$ |

*GC-FID = gas chromatography-flame ionization detector

TABLE III

Transition temperatures of the unsymmetrical diacetylenes prepared according to Example 4

| Diacetylene | n | n' | M.p. °C. | nomenclature |
|---|---|---|---|---|
| $C_{18(8-10)}$ | 5 | 7 | $-26.5$ | octadeca-7,9-diyne |
| $C_{19(5-14)}$ | 2 | 11 | $-8.1$ | nonadeca-4,6-diyne |
| $C_{22(10-12)}$ | 7 | 9 | $+3.1$ | docosa-9,11-diyne |
| $C_{22(8-14)}$ | 5 | 11 | $+2.0$ | docosa-7,9-diyne |
| $C_{24(10-14)}$ | 7 | 11 | $+18.2$ | tetracosa-9,11-diyne |

B—Preparation of the polydiacetylene compounds

EXAMPLE 5

The monomers or monomer mixtures obtained according to Examples 1 to 4 above were subjected to photopolymerization with a low-power UV lamp of wavelength 254 nm (flux at 15 cm: 260 $\mu W/cm^2$), the monomers being in the form of a thin film in the crystalline state.

The polymerizabilities were measured on samples of the pure diacetylenes. The most photochemically reactive pure diacetylenes are eicosa-9,11-diyne, $C_{20(10-10)}$, tetracosa-11,13-diyne, $C_{24(12-12)}$, docosa-9,11-diyne, $C_{22(10-12)}$, and tetracosa-9,11-diyne, $C_{24(10-14)}$. In Table II, the most photochemically reactive mixtures of diacetylenes (symmetrical + unsymmetrical) are mixtures no. 1, 3 and 5.

Figure 2A:
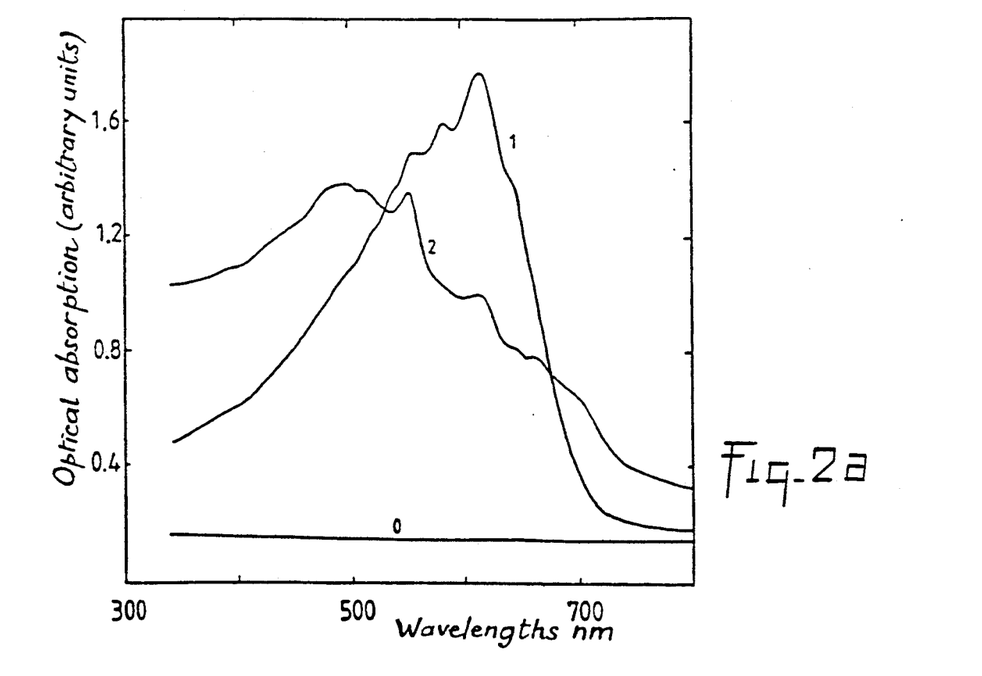
FIGS. 2a, 2b, and 2c are absorption spectra of polydiacetylene compounds recorded over a period of irradiation time.
Figure 2B:
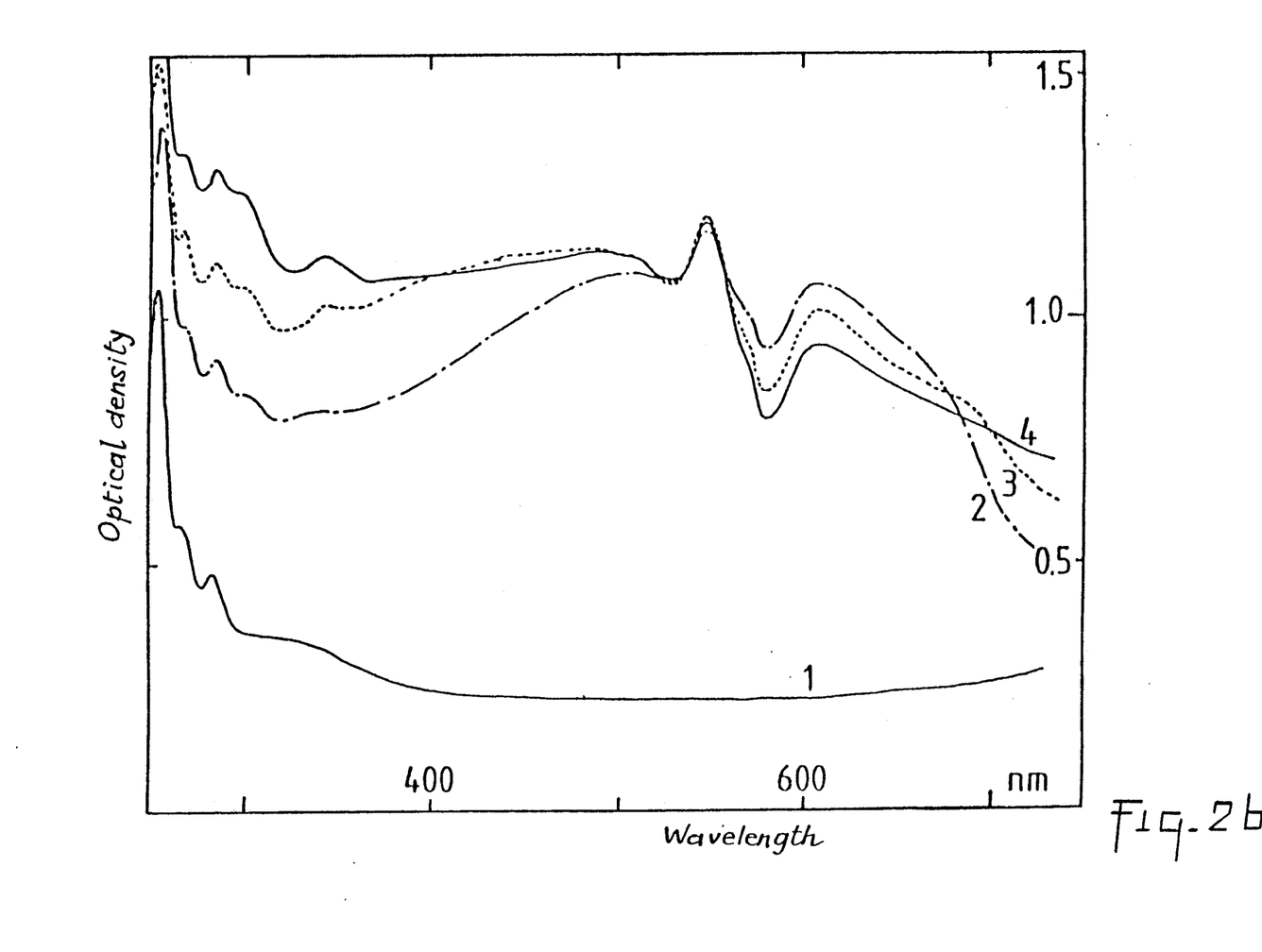
Figure 2C:
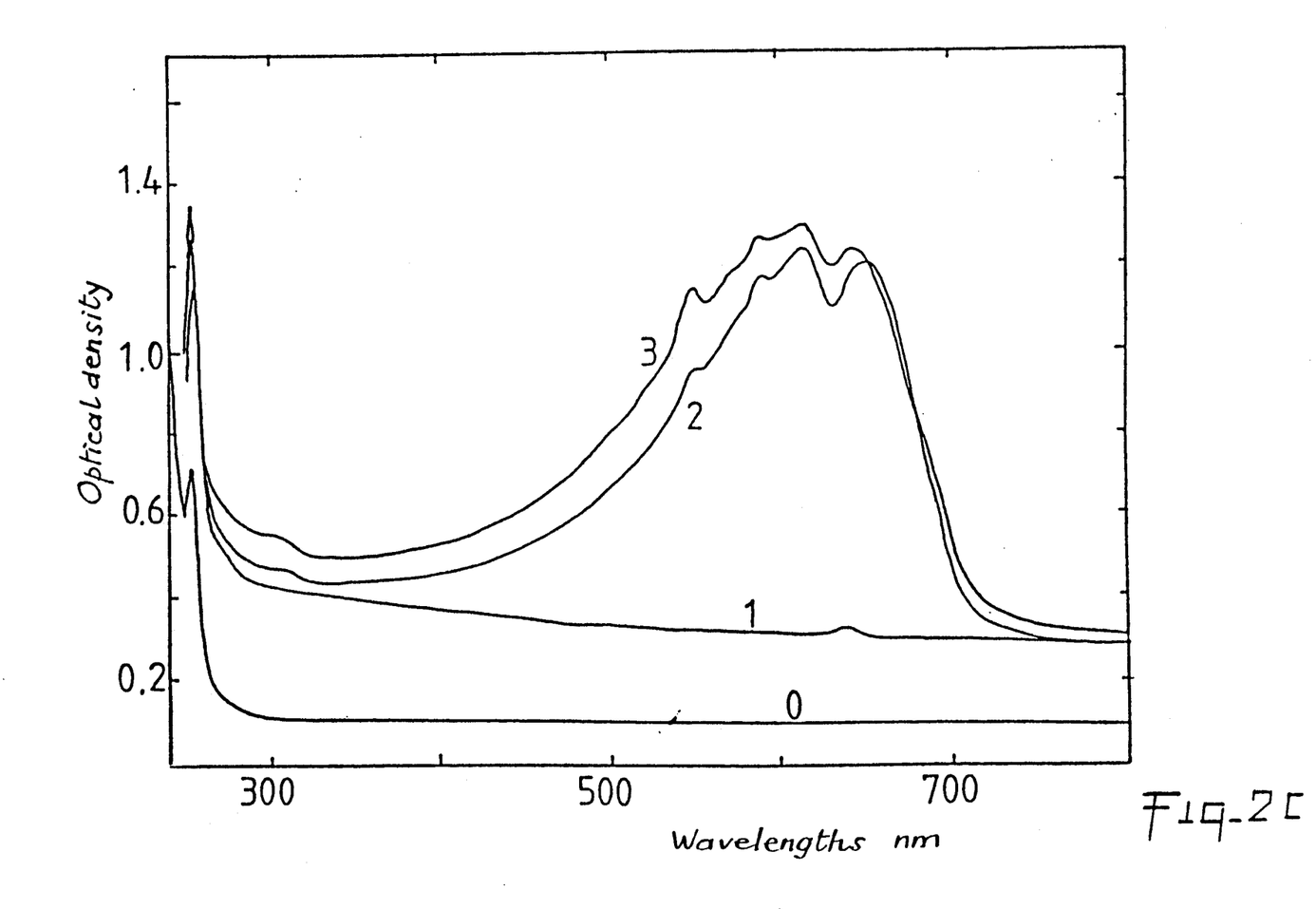

The absorption spectra of the polydiacetylene compounds were recorded as a function of the irradiation time of the monomer sample crystallized beforehand in the form of a thin film.

These spectra are shown in the attached FIGS. 2a, 2b and 2c, which respectively represent the polydiacetylene compounds obtained from the following monomers:

| | |
|---|---|
| $C_{20(10-10)}$ | (FIG. 2a) and |
| $C_{24(12-12)}$ | (FIG. 2b), | and from a $C_{16(8-8)}/C_{20(10-10)}$ mixture containing 80% of $C_{20(10-10)}$ (FIG. 2c).

The legend for FIGS. 2a, 2b and 2c is indicated in Table IV below; the times indicated in this table are the photopolymerization times at the temperatures given in the "compound" column.

TABLE IV

| FIGURE | Compound | Curve 0 | Curve 1 | Curve 2 | Curve 3 | Curve 4 |
|---|---|---|---|---|---|---|
| FIG. 2a | eicosa-9,11-diyne at −20° C. | monomer | 30 s | 35 min | — | — |
| FIG. 2b | tetracosa-11,13-diyne at 5° C. | — | monomer | 2 min 30 s | 10 min | 50 min |
| FIG. 2c | mixture of 20% $C_{16}$ and 80% $C_{20}$ at −38° C. | liquid monomers | crystalline monomers | 5 min | 10 min | — |

The results obtained show that the polydiacetylene compounds are transparent in the near IR from 750 nm. It is noted that these compounds have a blue shade which is the more distinct, the shorter the photopolymerization time.

Figure 3A:
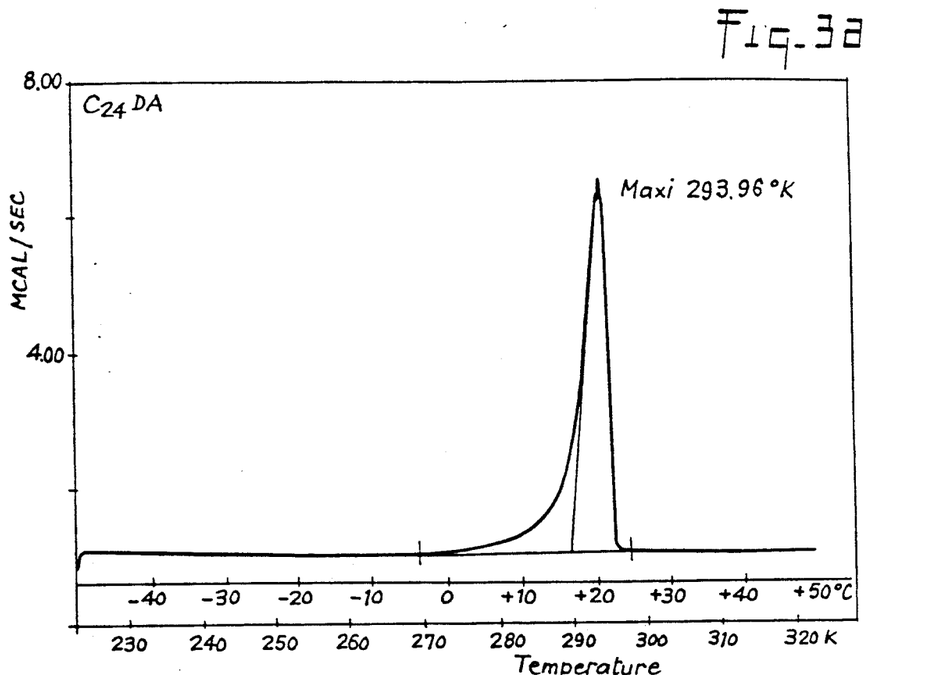
FIGS. 3a and 3b are differential scanning calorimeter diagrams of monomer and polymer.
Figure 3B:
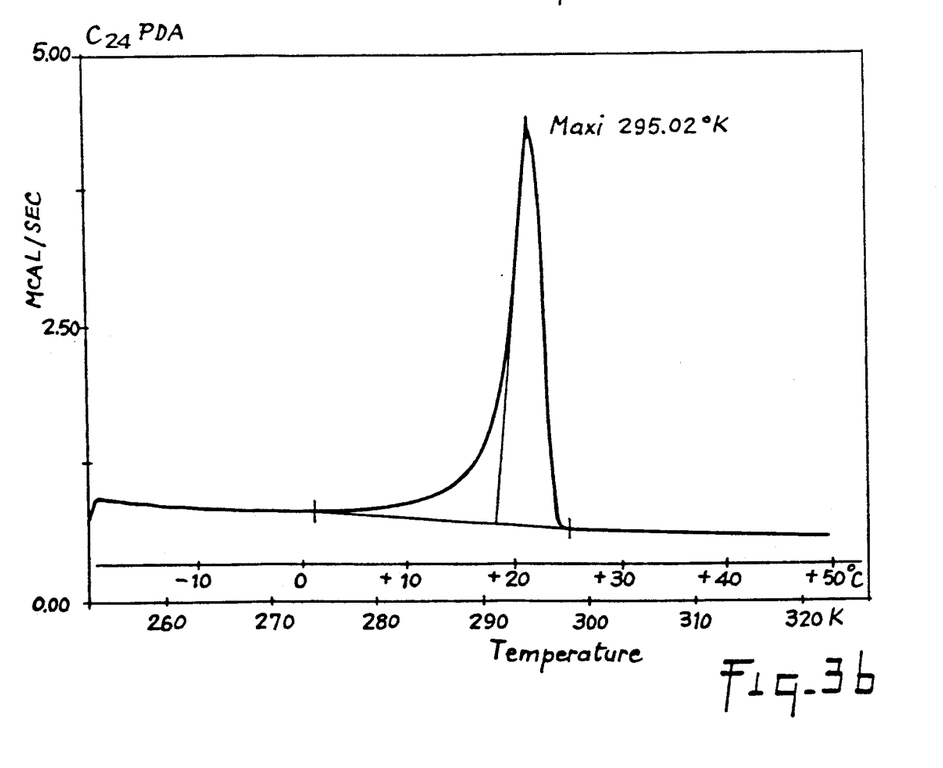

The transition temperatures of the monomer and the blue polymer were measured for $C_{24(12-12)}$ by differential scanning calorimetry. The results obtained are reported in FIGS. 3a ($C_{24(12-12)}$ diacetylene compound or $C_{24}$ DA) and 3b ($C_{24(12-12)}$ polydiacetylene compound or $C_{24}$ PDA) and show that there is a similarity between the two fusion diagrams.

EXAMPLE 6

Thermochromism of the $C_{20(10-10)}$ and $C_{16(8-8)}/C_{20(10-10)}$ (mixture) polydiacetylene compounds Different transmission spectra were recorded successively at increasing temperatures. The polymers were found to change progressively from blue to red. The polymers behave similarly in all cases, this color change always being irreversible.

Figure 4A:
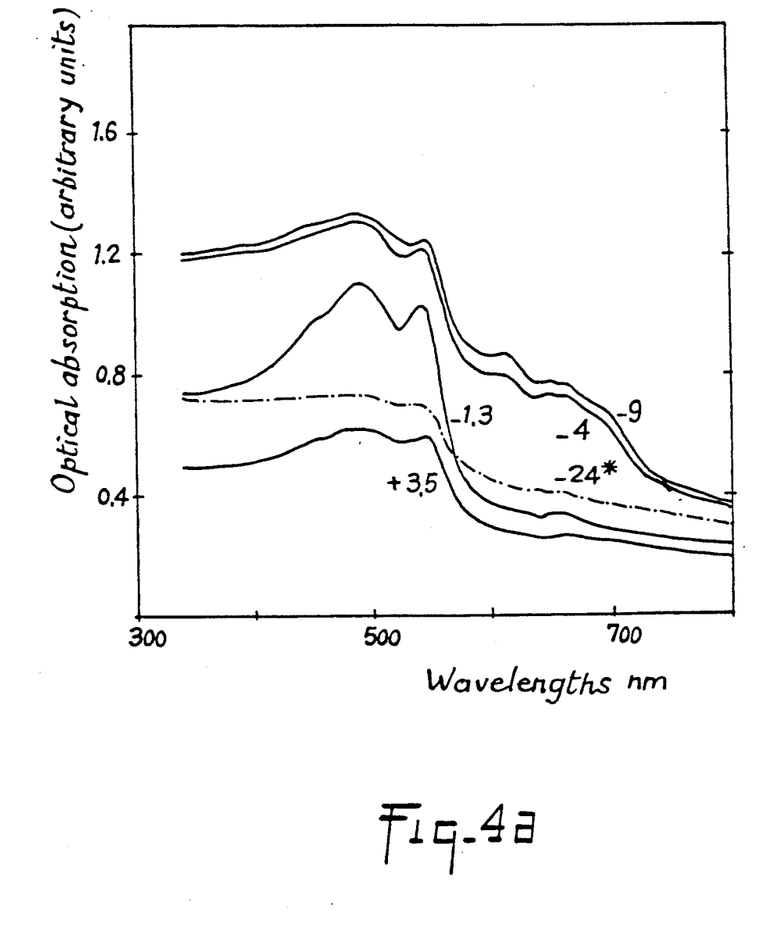
FIGS. 4a, 4b, and 4c are absorption spectra of polydiacetylene compounds taken at various times.
Figure 4B:
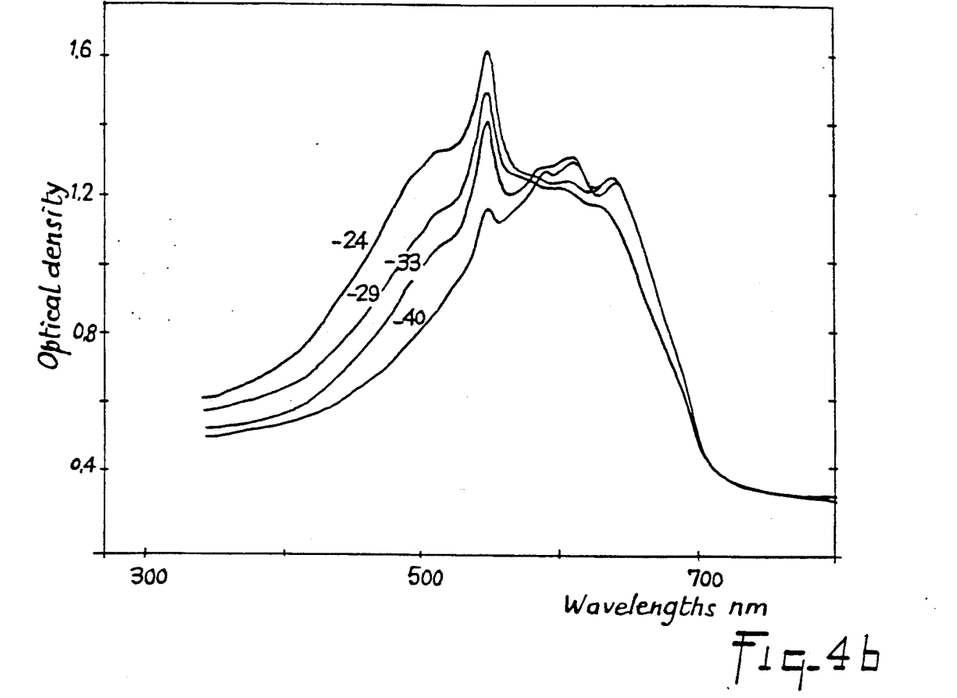
Figure 4C:
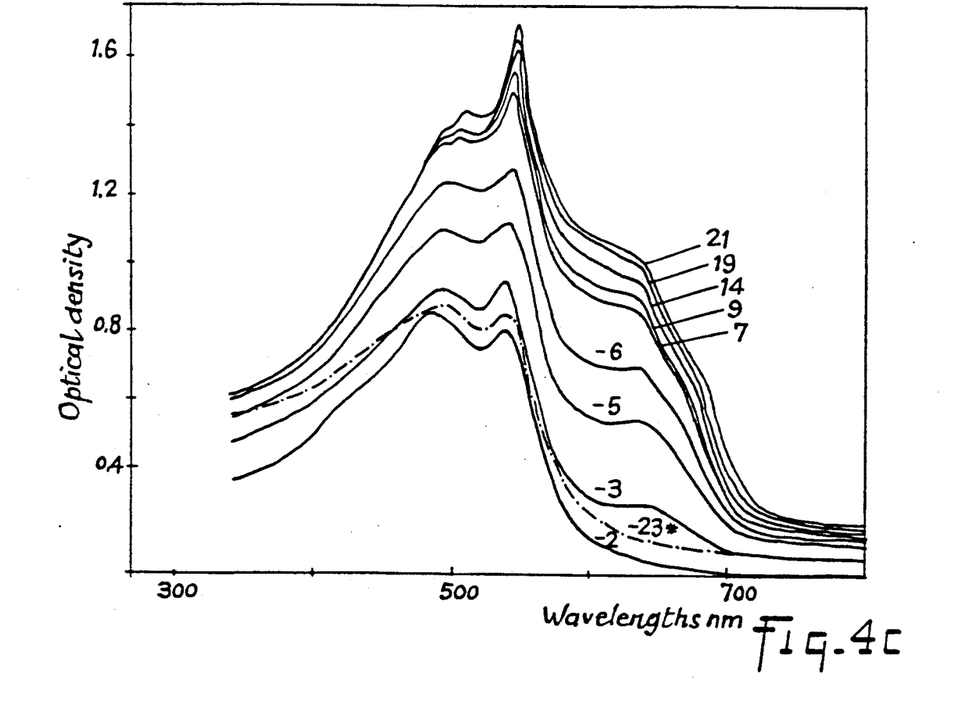

By way of example, FIGS. 4a, 4b and 4c show the change in the absorption spectra of the polydiacetylene compounds prepared in Example 5 from the $C_{20}$ diacetylenic monomer (FIG. 4a) or from the $C_{16(8-8)}/C_{20(10-10)}$ mixture (FIG. 4b and 4c), as a function of increasing temperatures (−9° C. to +3.5° C. for $C_{20}$ and −40° C. to −2° C. for the $C_{16(8-8)}/C_{20(10-10)}$ mixture—solid curves).

The return to low temperature after fusion gives the compounds a red type of absorption spectrum (discontinuous curves, T=−24° C. for $C_{20}$ and T=−23° C. for $C_{16(8-8)}/C_{20(10-10)}$). The irreversibility is thus noted. Furthermore, the observed color change is persistent. In fact, tests showed that, for red $C_{24(12-12)}$ or $C_{20(10-10)}$ polymers on different types of substrate (paper, glass, quartz), kept at temperatures of about −20° C. for periods ranging up to 3 months, no notable color change took place.

EXAMPLE 7

Thermochromism of the mixtures containing an unsymmetrical diacetylene

Thermochromism is observed on mixtures no. 1, 3 and 5 in Table 11. Observation is carried out with the aid of a thermomicroscopic analysis system; the monomer or mixture is deposited in a sapphire dish, permitting UV polymerization and microscopic observation.

Mixture no. 1 is polymerized at −45° C. (UV 254 nm, 5 cm) for a period of 10 min. It is blue-mauve in color. The start of the transformation is noted at −15° C., when it becomes dark red. This transition extends up to −9° C., when it becomes orange-red.

Mixture no. 3 is polymerized at −25° C. (UV 254 nm, 5 cm) for a period of 5 min. It is dark blue to black in color, depending on the thickness. The transition starts at −7° C., when the polymer is dark red. It becomes orange-red at −4° C. and the transformation is complete at +2° C.

Mixture no. 5 is polymerized at −20° C. (UV 254 nm, 5 cm) for a period of 1 min. It is navy blue in color and has a shiny appearance. The transition starts at about −8° C., when the color becomes mauve. It becomes red at −3° C. and the transition is complete at +5° C. with an orange-red color.

TABLE V

Photopolymerizability of the pure diacetylenes. UV irradiation at 254 nm, distance 5 cm; (+++) dark blue for an irradiation time < 1 min, (++) dark blue for $t_{ir}$ < 5 min, (+) blue for $t_{ir}$ > 5 min, (−) no polymerization after $t_{ir}$ > 30 min.

| diacetylene | T °C. of sample | photopolymerization |
|---|---|---|
| $C_{16(8-8)}$ | −45 | (+)[c], (−) |
| $C_{18(9-9)}$ | −25 | (−) |
| $C_{19(5-14)}$ | −30 | (+) |
| $C_{20(10-10)}$ | −20 | (+++) |
| $C_{22(10-12)}$ | −15 | (+++)[a] |
| $C_{22(11-11)}$ | ambient | (−) |
| $C_{22(8-14)}$ | −22 | (++)[a] |
| $C_{24(12-12)}$ | +5 | (+++) |
| $C_{24(10-14)}$ | +9 | (+++)[a] |
| $C_{28(14-14)}$ | ambient | (+++)[b], (−) |
| $C_{32(16-16)}$ | ambient | (+++)[b], (−) |

[a] mauve color;
[b] polymerizes rapidly on certain substrates: paper, $SiO_2$ chromatography plates;
[c] polymerization not reproducible; $t_{ir}$ = irradiation time.

EXAMPLE 8

Preparation of a polydiacetylene in a polymer 2.5 mg of $C_{24(12-12)}$ monomeric diacetylene are incorporated into 2.7 mg of molten polyethylene at 145° C. (molecular weight 21,000). A thin film is obtained on cooling, which is then brought to +5° C. in order to crystallize the incorporated diacetylene.

The film is then subjected to UV irradiation at 254 nm for 3 min. The film becomes an intense blue. Heating of the film is observed by a thermomicroscopic system from 5° to 25° C. at a rate of 2° C. per minute. The color change from blue to mauve starts at 12° C. and the irreversible red color appears from 16° C., the maximum of the heat of fusion peak for $C_{24(12\text{-}12)}$ being situated at 20.5° C.

What is claimed is:

1. A temperature indicator for detecting whether the temperature of an article has exceeded a selected temperature threshold which comprises a chemically inert substrate and deposited on the substrate at least one polydiacetylene compound exhibiting irreversible thermochromism so that the compound undergoes a change from a blue color to a red color at the selected temperature and obtained by the polymerization of a monomer of formula (I):

$$CH_3-(CH_2)_n-C\equiv C-C\equiv C-(CH_2)_{n'}-CH_3 \qquad (I)$$

in which n and n' are identical or different integers between 2 and 21, or of a mixture of such monomers, the monomer or monomers being in the crystalline state during the polymerization and the polymerization being carried out to obtain a blue color.

2. A temperature indicator according to claim 1, wherein the monomer is in the form of a polycrystalline film or a single crystal.

3. A temperature indicator according to claim 1, wherein the substrate is paper, glass, fabric, quartz, metal, or a polymer.

4. A temperature indicator according to claim 1, wherein the color of the polydiacetylene compound changes suddenly from blue to red when the temperature of the article exceeds the temperature threshold.

5. A temperature indicator according to claim 1, wherein the polydiacetylene compound is obtained by photopolymerization of the monomer with high-energy radiation.

6. A temperature indicator according to claim 1, wherein the monomer is in the form of a polycrystalline film or a single crystal during the polymerization and the color of the polydiacetylene compound changes suddenly from blue to red when the temperature of the article exceeds the temperature threshold and the polydiacetylene compound is obtained by photopolymerization of the monomer with high-energy radiation.

7. A temperature indicator for detecting whether the temperature of an article has exceeded a selected temperature threshold which comprises a mixture of a thermoplastic and at least one polydiacetylene compound exhibiting irreversible thermochromism so that the compound undergoes a change from a blue color to a red color at the selected temperature and obtained by the polymerization of a monomer of formula (I):

$$CH_3-(CH_2)_n-C\equiv C-C\equiv C-(CH_2)_{n'}-CH_3 \qquad (I)$$

in which n and n' are identical or different integers between 2 and 21, or of a mixture of such monomers, the monomer or monomers being in the crystalline state during the polymerization and the polymerization being carried out to obtain a blue color, the thermoplastic being inert to the polydiacetylene compound or compounds.

8. A temperature indicator according to claim 7, wherein the monomer is in the form of a polycrystalline film or a single crystal.

9. A temperature indicator according to claim 7, wherein the thermoplastic is compatible with olefins.

10. A temperature indicator according to claim 7, wherein the thermoplastic is compatible with polyolefins.

11. A temperature indicator according to claim 7, wherein the mixture is in the form of a thin film.

12. A temperature indicator according to claim 7, wherein the color of the polydiacetylene compound changes suddenly from blue to red when the temperature of the article exceeds the temperature threshold.

13. A temperature indicator according to claim 7, wherein the polydiacetylene compound is obtained by photopolymerization of the monomer with high-energy radiation.

14. A temperature indicator according to claim 7, wherein the monomer is in the form of a polycrystalline film or a single crystal during the polymerization and the color of the polydiacetylene compound changes suddenly from blue to red when the temperature of the article exceeds the temperature threshold and the polydiacetylene compound is obtained by photopolymerization of the monomer with high-energy radiation.

* * * * *